United States Patent
Barot

(10) Patent No.: US 9,513,037 B2
(45) Date of Patent: *Dec. 6, 2016

(54) MOTOR CYCLE AIR CONDITIONING SYSTEM

(71) Applicant: OxiCool, Inc., Malvern, PA (US)

(72) Inventor: Ravikant T. Barot, Chesterbrook, PA (US)

(73) Assignee: OXICOOL, INC., Malvern, PA (US)

(*) Notice: Subject to any disclaimer, the term of this patent is extended or adjusted under 35 U.S.C. 154(b) by 27 days.

This patent is subject to a terminal disclaimer.

(21) Appl. No.: 14/259,235

(22) Filed: Apr. 23, 2014

(65) Prior Publication Data
US 2014/0216089 A1    Aug. 7, 2014

Related U.S. Application Data

(63) Continuation of application No. 12/598,156, filed as application No. PCT/US2008/062118 on Apr. 30, 2008, now Pat. No. 8,739,566.

(Continued)

(51) Int. Cl.
*F25B 27/00*    (2006.01)
*F25B 30/04*    (2006.01)
(Continued)

(52) U.S. Cl.
CPC ............... *F25B 30/04* (2013.01); *B62J 33/00* (2013.01); *F24F 2221/38* (2013.01); *F25B 17/083* (2013.01); *F25D 2400/26* (2013.01)

(58) Field of Classification Search
CPC ... F24F 2221/38; F25D 2400/26; F25B 30/04; F25B 17/083
(Continued)

(56) References Cited

U.S. PATENT DOCUMENTS 2,078,508 A    4/1937    Lawrence
2,195,604 A    4/1940    Taylor
(Continued)

FOREIGN PATENT DOCUMENTS

CA    2171265 A1    12/1996
JP    04-194561 A    7/1992
(Continued)

OTHER PUBLICATIONS

Office Action dated Dec. 6, 2013 for U.S. Appl. No. 12/537,852.
(Continued)

*Primary Examiner* — Marc Norman
*Assistant Examiner* — David Teitelbaum
(74) *Attorney, Agent, or Firm* — Lee & Hayes, PLLC

(57) ABSTRACT

A Motor Cycle personal cooling system is disclosed that utilizes waste heat employing solid adsorption. The system includes an air distribution module and one or more desiccant chambers encircling the exhaust pipes of the Motor Cycle. Air blowers blow ambient air across the heat exchanger, cooling the air, transferring heat to the heat exchanger, transferring heat to the water, causing it to boil, and turning the water into vapor which is then adsorbed by the desiccant. A heat source is then applied to the desiccant which releases the vapor that travels to one of the heat exchangers and condenses the vapor back into water. A cooling garment worn by the rider of the Motor Cycle has a cool air input and an exhaust output. The cool air input of the cooling garment receives cooled air from the air blowers, and body heat exits out the exhaust output.

20 Claims, 2 Drawing Sheets

Related U.S. Application Data

(60) Provisional application No. 60/914,931, filed on Apr. 30, 2007.

(51) Int. Cl.
   *B62J 33/00* (2006.01)
   *F25B 17/08* (2006.01)

(58) Field of Classification Search
   USPC .................. 62/259.3, 93, 335, 79, 238.3
   See application file for complete search history.

(56) References Cited

U.S. PATENT DOCUMENTS

| | | | |
|---|---|---|---|
| 2,201,024 | A | 5/1940 | Brown, Jr. |
| 2,532,012 | A | 11/1950 | Dasher |
| 3,064,819 | A | 11/1962 | Jones |
| 3,270,512 | A | 9/1966 | Webb |
| 3,581,514 | A | 6/1971 | Hamerski et al. |
| 3,744,555 | A * | 7/1973 | Fletcher ............ G05D 23/2439 165/46 |
| 3,774,374 | A | 11/1973 | Dufour et al. |
| 4,113,004 | A | 9/1978 | Rush et al. |
| 4,180,985 | A | 1/1980 | Northrup, Jr. |
| 4,197,714 | A | 4/1980 | Bradshaw |
| 4,199,959 | A | 4/1980 | Wurm |
| 4,527,398 | A | 7/1985 | Schaetzle |
| 4,722,099 | A | 2/1988 | Kratz |
| 4,761,968 | A | 8/1988 | Basseen et al. |
| H902 | H | 4/1991 | Rousseau |
| 5,089,119 | A | 2/1992 | Day et al. |
| 5,146,757 | A | 9/1992 | Dearing |
| 5,279,503 | A | 1/1994 | Propst |
| 5,477,706 | A | 12/1995 | Kirol et al. |
| 5,526,648 | A | 6/1996 | Wertenbach et al. |
| 5,564,124 | A | 10/1996 | Elsherif et al. |
| 5,660,048 | A * | 8/1997 | Belding ................ B01D 53/06 165/7 |
| 5,732,569 | A | 3/1998 | Sanada et al. |
| 5,768,908 | A | 6/1998 | Tanaka et al. |
| 6,029,462 | A | 2/2000 | Denniston |
| 6,209,622 | B1 | 4/2001 | Lagace et al. |
| 6,240,742 | B1 | 6/2001 | Kaufman et al. |
| 6,510,696 | B2 | 1/2003 | Guttman et al. |
| 6,557,365 | B2 | 5/2003 | Dinnage et al. |
| 6,564,571 | B2 | 5/2003 | Feeney |
| 6,854,279 | B1 | 2/2005 | Digiovanni et al. |
| 6,932,148 | B1 | 8/2005 | Brummett et al. |
| 7,114,266 | B2 | 10/2006 | Gomes et al. |
| 7,120,938 | B2 | 10/2006 | Ichigaya |
| 7,152,421 | B2 | 12/2006 | Parks et al. |
| 7,836,723 | B2 | 11/2010 | Kaufman et al. |
| 8,739,566 | B2 | 6/2014 | Barot |
| 2003/0136140 | A1 | 7/2003 | Maeda et al. |
| 2004/0000152 | A1 * | 1/2004 | Fischer ................ F24F 3/1423 62/94 |
| 2005/0091988 | A1 * | 5/2005 | Stewart .................. B60P 3/007 62/3.1 |
| 2005/0150378 | A1 | 7/2005 | Dunne et al. |
| 2005/0172655 | A1 | 8/2005 | Naaman |
| 2005/0214609 | A1 | 9/2005 | McElroy |
| 2006/0191270 | A1 | 8/2006 | Warren |
| 2006/0254290 | A1 | 11/2006 | Michalski et al. |
| 2007/0028769 | A1 | 2/2007 | Eplee et al. |
| 2007/0079623 | A1 | 4/2007 | Inaba et al. |
| 2010/0043462 | A1 | 2/2010 | Barot et al. |
| 2010/0132391 | A1 | 6/2010 | Barot |
| 2016/0033177 | A1 | 2/2016 | Barot et al. |

FOREIGN PATENT DOCUMENTS

| | | |
|---|---|---|
| JP | 05-126432 A | 5/1993 |
| JP | 2002-081689 A | 3/2002 |
| JP | 2004-237816 A | 8/2004 |
| JP | 2005-076168 A | 3/2005 |

OTHER PUBLICATIONS

PCT Search Report & Written Opinion for Application No. PCT/US2008/062118, mailed Mar. 25, 2009, 11 pages.

Wang, "Adsorption Refridgeration: A survey of Novel technologies," Feb. 2007, Recent Patents on Engineering, vol. 1, No. 1, pp. 1-21. Abstract.

Indian Office Action mailed Aug. 16, 2016 for Indian patent application No. 3962/KOLNP/2009, a counterpart foreign application of U.S. Appl. No. 12/598,156, 8 pages.

* cited by examiner

MOTOR CYCLE AIR CONDITIONING SYSTEM

CROSS-REFERENCE TO RELATED APPLICATIONS

This application is a continuation of U.S. patent application Ser. No. 12/598,156 filed on Oct. 29, 2009, which is the National Stage of International Application No. PCT/US2008/062118, filed Apr. 30, 2008, which claims the benefit of U.S. Provisional Patent Application No. 60/914,931, filed Apr. 30, 2007, the disclosures of which are incorporated herein by reference in their entirety.

FIELD OF THE INVENTION

The present invention relates to personal cooling systems for riders of two/three wheeler (hereinafter called Motor Cycle) vehicles, in particular, the use of waste exhaust heat employing solid adsorption to cool persons riding those vehicles.

BACKGROUND OF THE INVENTION

The military personnel, athletes, and racecar drivers have all designed and used personal cooling systems. Commercial personal cooling systems use various technologies such as (1) frozen gel paks (2) paraffin phase change, (3) evaporative, (4) air circulated by fan, (5) thermo-electric, and 6) circulating water using either ice or vapor compression. Each technology has its limitation in a Motor Cycle personal cooling system. No personal cooling system has been made commercially available using solid adsorption, desiccant technology. Also, no personal cooling system has utilized waste heat for an energy source in the personal cooling system.

The use of desiccants in refrigeration systems is well known in the prior art. For example, U.S. Pat. No. 6,557,365, describes a desiccant refrigerant and dehumidifier that uses material is used to absorb moisture from the ambient hot and humid air.

Additionally, apparatuses for cooling a motorcyclist are well known. For example, U.S. Pat. No. No. 4,722,099 describes a protective motorcycle garments for maximum cooling which allows ambient air to flow through the garments. The air which flows through the garment is not cooled, so that the cooling effect is very limited, and depends on the ambient air temperature. CAN. patent application No. 2,171,265 describes a motorcycle helmet having a thermo-electric device. The thermoelectric device cools only the inner space of the helmet, has relative low cooling power, and being located near the motorcyclist head can cause the motorcyclist severe head damage as a result of an accident. The thermoelectric device is relatively heavy, it can electrify the motorcyclist and the motorcyclist wearing the thermo-electric device has to exert an effort to continuously balance helmet.

There is one patent on a Motor Cycle air conditioning system that uses thermoelectric modules for cooling, U.S. Pat. 6,510,696. The '696 patent describes a thermoelectric air-condition apparatus with controllable air flows, however, its thermoelectric, modules are powered by electricity and thus they also cause a significant draw of current from the existing electrical system.

Accordingly, there is a need for an Motor Cycle personal cooling system that can be mounted on a Motor Cycle, that can satisfy various cooling thermal requirements for the Motor Cycle rider and/or passenger, and not cause significant draw of engine power or electric current.

BRIEF SUMMARY OF THE INVENTION

The present invention utilizes a desiccants in the Motor Cycle personal cooling system 10 (FIG. 1), utilizing the exhaust heat of the motor cycle engine, and does not cause any significant draw of engine power or electric power from the motor cycle engine. The invention provides air conditioning via a cool suit 20 (FIG. 3) that could be single or more layers where one/some of the multiple layers, if used, could serve as an insulator/cooler.

The layer serving as insulator and the layer serving as primary cooler could be driven by different cooling sources. For example, the primary cooler layer could be cooled by the solid adsorption method and the insulator layer could be cooled by thermo-electrics. The method of using dual (or multiple) chamber cooling where one or more chamber acts as cooling layer and one or more chamber acts as insulating layer, could be applied to Motor Cycle suits but also to all other cool suit applications including but not limited to Military use cool suits, NASA suits, medical use suits, race car driver suits.

A further object of the invention is to provide cool breathing air to the helmet of the Motor Cycle driver and passenger.

Yet another object of the invention is to provide humidity control to the Motor Cycle driver and passenger.

Still yet another object of the invention is to provide such cooling utilizing nontoxic and environmentally friendly liquids and/or gases.

Another object of the invention is to provide for a modular air-conditioning system that is efficient in its operation while at the same time is modular to provide add-on capabilities for the air-conditioning systems.

A further object of the invention is to provide an air conditioning system to a Motorcycle rider and/or passenger using a refrigerant that is free of CFC (Chlorofluorocarbon, a class of chemical compounds that deplete ozone) and HFC (HydroFluoroCarbon).

Yet another object of the invention is to provide an air conditioning system to a Motorcycle rider and/or passenger that, in one embodiment, could derive energy from previously stored, but not dissipated, recharged cycles.

DESCRIPTION OF EMBODIMENTS

One embodiment of the Motor Cycle personal cooling system uses a solid adsorption cooling mechanism 10 in which a liquid or gas fluid that is cooled using a desiccant based heat exchange system is circulated within a cool suit 20 by a driver. In that embodiment, an air-conditioning modular system comprises a heat exchanger and a desiccant chamber maintained under low pressure, and means for transferring water vapor from the heat exchanger to the desiccant chamber. The desiccant chamber contains a water adsorbing desiccant—zeolite in this case. The heat exchanger contains water and housing with heat-exchanging fins. The air-conditioning module utilizes tubes for interconnecting the desiccant chamber and the heat exchanger. The pressures of the desiccant chamber and the heat exchanger are maintained to reduce the boiling point of water therein to be near room temperature.

Figure 1:
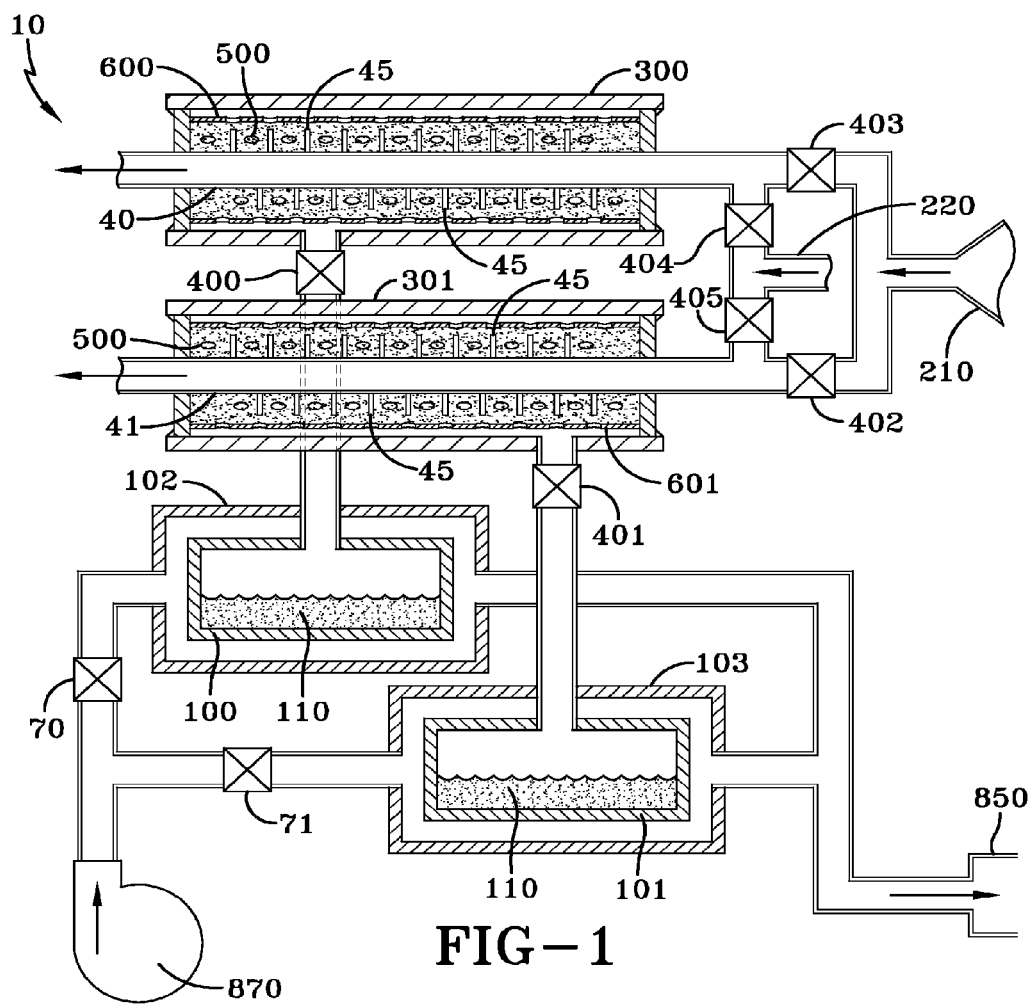
FIG. 1 shows the overall schematic diagram illustrating Motor Cycle Air Conditioning System

Referring now specifically to the drawings, FIG. 1 shows desiccant chambers 300 and 301 are connected to heat exchangers 100 and 101 and water vapor flow through those pipes is controlled by valves 400 and 401. Chambers 300 and 301 have piping 40 and 41 passing though the center of the chambers. Piping 40 and 41 has fins 45 on the outside and is constructed so that efficient heat transfer can happen from the piping 40 and 41 to the desiccant contained in the chamber 300 and 301. Chambers 300 and 301 are filled with a desiccant (for example zeolite). Chambers 300 and 301 have a built in perforated chamber separator 600 and 601 that form a space on the outer edges of the chambers 300 and 301, and perforations 500, facilitate the free and efficient movement of water vapor. The distribution module comprises of valves 402, 403, 404, 405, funnel 210, and exhaust connector 220 and allows either air or hot exhaust from the engine that is channeled either through piping 41 and 40, depended on whether the cooling system is in a cooling or recharging phase. Blower 200 with valves 70 and 71 force the ambient blower air through heat exchanger housings either 102 or 103 as desired.

This embodiment has two cooling units that alternate from a cooling phase to a re-charging phase. At any given time, one cooling unit is in cooling phase while the other is in recharging phase. An alternate embodiment could have at least one or more cool units. In case of three cool units, the system could have three cycles—(a) cooling—desiccant adsorption, (b) drying—desiccant desorption through heating, and (c) reversion to ambient temperature.

The Cooling Phase

In the cooling phase, desiccant chamber 300 and heat exchanger 100 is in cooling phase. Ambient air from funnel 210 is channeled to the piping 40 by keeping valve 403 open and valve 402 closed. The valve 400 is computer controlled and is opened as required to allow required quantity of water vapor to transfer to the desiccant in chamber 300 such that cooling happens in heat exchanger 100 that cools the air that is blown by blower 200 via valve 70 to the heat exchanger housing 102 and then to the cool suit via connection 850. The heat from the water vapor transfers to the desiccant that is transferred via fins 45 and piping 40 to the flowing ambient air.

The Recharging Phase

In recharging phase the cooling unit formed by desiccant chamber 301 and heat exchanger 101 is in recharging phase. In this case, the engine exhaust is channeled to the piping 41 by keeping valve 405 open and valve 404 closed. The heat from the exhaust gases transfers to the desiccant in the chamber 301 via piping 41 and fins 45 which causes the desiccant to release the water vapor which travels to the heat exchanger via valve 401 which is kept open by computer control and the water vapor condenses into water to settle in heat exchanger 101.

Figure 3:
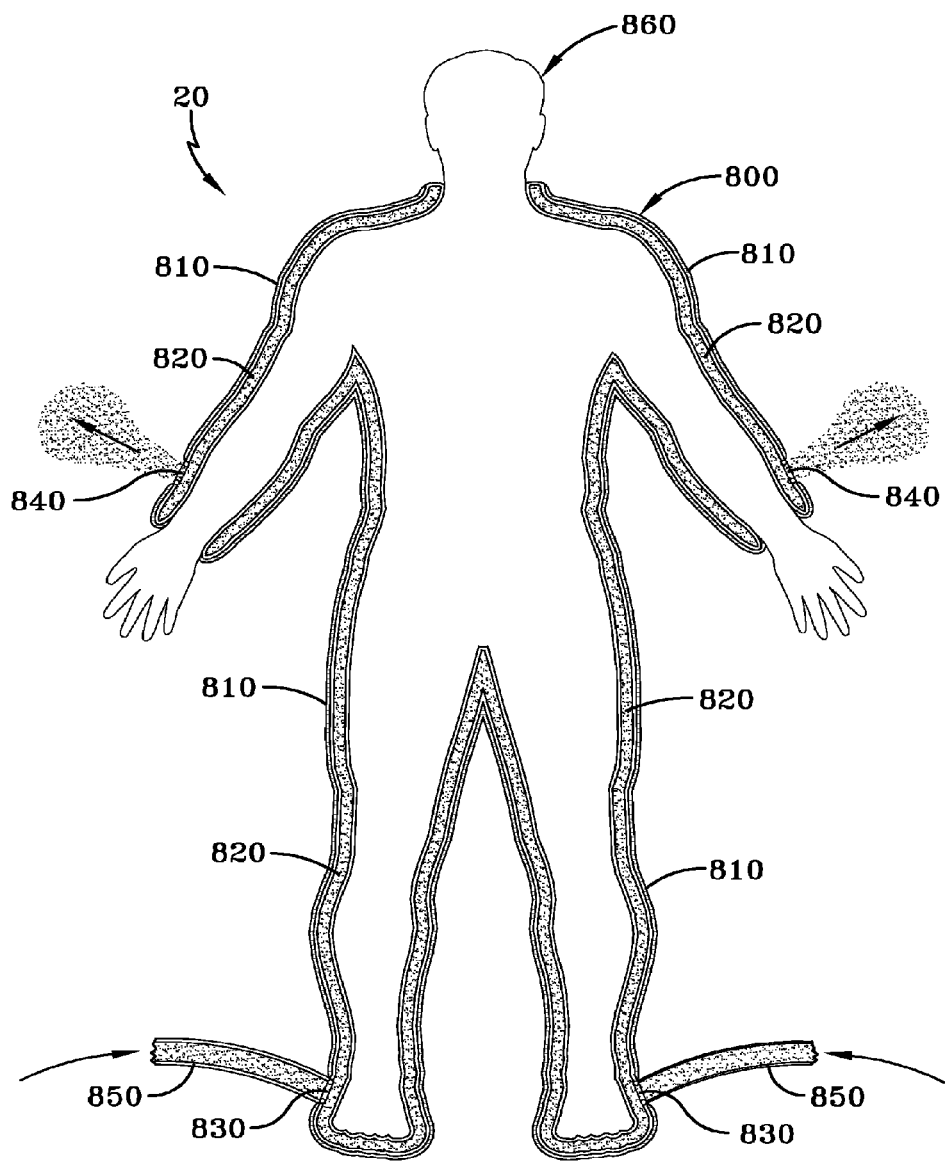
FIG. 3 is the cool suit, cooled by the system shown in FIG. 1.

The cool suit 20 in FIG. 3 is made of three separate layers such that two independent channels 810 and 820 are formed. The cool air from the cool unit is connected to the channel 820 via connector 850 and inlet 830 that is then circulated in the suit and released from outlet 840. The channel 810 could be used as an insulating layer filled by an insulator or we could have a built in thermoelectric module to cool the air contained in the channel 810. In another embodiment, some of the air from outlet 840 could be re-circulated back into the cool suit via connector 830.

Optional Variants

Figure 2:
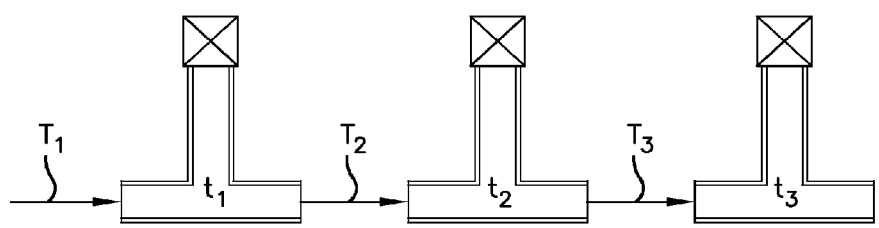
FIG. 2 is a cooling unit consisting of multiple heat exchangers connected in parallel by valves and piping.

Condensation around the cooling chamber can be limited by suitably controlling the amount of moisture permitted to enter the cooling chamber that thereby limits the rate of water vapor adsorption and consequent cooling rate. A desiccant wheel could be utilized to control the humidity. This wheel could also be recharged using the waste heat of the Motor Cycle exhaust. A combination of valves can regulate the path of cooled fluid (whether gas or liquid) to channel cooled fluid to preferred part of a garment, thereby preferentially cooling certain portion of the wearer's body in order to improve comfort. Multiple cool units can be put in service to operate in parallel but at different time frequencies. While one or more units are being used in its cooling cycle, another one or more can be recharged. The cooling unit fluid used in the system could be water, or other suitable liquid matched with an appropriate desiccant that has a tendency to adsorb that fluid. The fluid circulated between garment and cooling unit could be water or another liquid or could be a gas such as air. The garment could contain multiple layers in which at least two are cooling layers that operate in conjunction. The bottom layer could use circulated air to achieve evaporative cooling of body moisture. One or more of the layers could be a closed, recycled air system that could be cooled by thermo-electric means, and which could also, act as an insulator. A cooling unit could typically be made largely of stainless steel in order to achieve structural integrity and corrosion resistance while maintaining acceptable thermal conductivity through appropriate design. A cooling unit could consist of more than one liquid chamber connected in parallel by valves, as shown in FIG. 2, regulated to maintain pressure difference between the chambers. Through suitable regulation, the liquids in more than one chamber could be made to boil simultaneously when chambers are placed in graded temperature environments, thereby providing for increased cooling over a short period. In FIG. 2, the ambient air T1 is cooled to a lower temperature T2 by passing across the heat exchanger at temperature t1, T2 then cools to a lower temperature T3 by passing across heat exchanger at temperature t2. This cycle can be expanded by adding additional heat exchangers in parallel all of which could be computer controlled.

One configuration of the system would be a modular air-conditioning system comprising:

- A power regulator that manages the power for the blowers and the temperature regulators,
- A blower that circulates the cool air through the cool suit, sends cool air to the helmet, and cools the heat exchanger, and
- Three or more solid adsorption cooling chambers (utilizing zeolite) staged in parallel. One in use, a second in stand by, and the third being recharged by the waste heat of the Motor Cycle exhaust.
- The cool suit with air distribution channels can be configured to cover the whole body, or can be configured to cover the upper body only.
- A helmet attachment for circulating clean cool breathable air to the helmet could be provided.
- The system may be supplemented by thermoelectric modules after the solid adsorption cooling chambers.
- Additionally, the system may be supplemented by using desiccant wheels, re-charged by waste heat, to manage the humidity in the cool suit and/or for the breathing air to the helmet.

The system could be applied as a personal cooling system to people other than Motor Cycle drivers and riders. For example, it could be used by military personnel, race car drivers, athletes, factory workers, ship crew, truck drivers, aircraft crew, and anyone else who seeks to cool their personal environment. The system could be applied to non-garment applications such as cooling of food, water, beverages, electronic equipment, mechanical equipment, medical equipment, medical supplies, blood, medicine, and air inside spaces such as small rooms and air, land and sea craft. Solid desiccant can be replaced by liquid desiccant. The system could be used in series or in parallel with other cooling technologies such as any of those mentioned above. Alternative heat sources could be used such as, concentrated sunlight, vehicle engine waste heat, industrial waste heat, and geothermal sources are also suitable. As to a further discussion on the manner and usage of the present invention, the same should be apparent from the above description. Numerous other modifications and changes would readily occur to those skilled in the art, and all suitable modifications and equivalents fall within the scope of the invention.

The invention claimed is:

1. A personal cooling system for use with a motor cycle comprising:
    an air distribution module;
    one or more desiccant chambers under low pressure encircling one or more exhaust pipes of the motor cycle, wherein a cooling unit consists of a series of liquid chambers connected by valves regulated to maintain pressure differences between the chambers, the valves regulating more than one chamber and make the refrigerant in the chambers boil simultaneously when the chambers are placed in a graded temperature environment;
    one or more heat exchangers under low pressure;
    one or more air blowers blowing ambient air across the one or more heat exchangers, cooling the air, transferring heat to the heat exchanger, transferring heat to water, causing the water to boil, and turning the water into vapor which is then adsorbed by the desiccant, the heat from the desiccant is then transferred to ambient air via flowing air;
    a heat source applied to the desiccant which releases the vapor that travels to one of the heat exchangers and condenses the vapor back into water;
    the cool air exiting from across the heat exchanger transferred to a cooling garment worn by a rider of the motor cycle;
    the cooling garment having a cool air input and an exhaust output;
    the cool air input receiving cooled air from the air blowers, and heated air from body heat exiting out the exhaust output.

2. The motor cycle personal cooling system of claim 1, wherein the one or more desiccant chambers have a second inner layer close to a desiccant chamber outer layer, that is made of perforated material that acts as an air channel for movement of water vapor and heat.

3. The motor cycle personal cooling system of claim 1, wherein the refrigerant of the above system is water and the desiccant is zeolite.

4. The motor cycle personal cooling system of claim 1, wherein the cooling garment is configured to cover an upper body only.

5. The motor cycle personal cooling system of claim 1, wherein the system is supplemented by using desiccant wheels, re-charged by waste heat, to manage the humidity in the cooling garment.

6. The motor cycle personal cooling system of claim 1, wherein the one or more desiccant chambers are constructed to encircle the exhaust pipe allowing the transference of heat from exhaust heat.

7. The motor cycle personal cooling system of claim 1, wherein the desiccant chamber has a second inner layer close to a desiccant chamber outer layer, that is made of perforated material which acts as an air channel for efficient movement of water vapor and heat.

8. The motor cycle personal cooling system of claim 1, wherein additional cooling and humidity control is provided by embedding a thermoelectric unit in the cooling garment worn by the rider using the motor cycle personal cooling system.

9. A motor cycle personal cooling system comprising:
    a first desiccant chamber configured to be fluidly coupled to at least one exhaust pipe of a motor cycle, the first desiccant chamber including a first desiccant and being configured to alternate between a cooling mode and a re-charging mode, whereby the first desiccant is configured to absorb a first refrigerant when in the cooling mode, and the first desiccant is configured to desorb the first refrigerant when in the re-charging mode;
    a first heat exchanger coupled to the first desiccant chamber such that when the first desiccant chamber is in the re-charging mode, the first refrigerant moves from the first desiccant chamber to the first heat exchanger;
    a second desiccant chamber configured to be fluidly coupled to the at least one exhaust pipe of the motor cycle, the second desiccant chamber including a second desiccant and being configured to alternate between a cooling mode and a re-charging mode, whereby the second desiccant is configured to absorb a second refrigerant from when in the cooling mode, and the second desiccant is configured to desorb the second refrigerant when in the re-charging mode;
    a second heat exchanger coupled to the second desiccant chamber such that when the second desiccant chamber is in the re-charging mode, the second refrigerant moves from the second desiccant chamber to the second heat exchanger;
    an air distribution module including an air inlet and an exhaust inlet, the air distribution module being coupled to the first desiccant chamber such that when the first desiccant chamber is in the cooling mode, air enters the air inlet and moves across the first desiccant chamber to thereby cause the first desiccant to absorb the first refrigerant and when the first desiccant chamber is in the re-charging mode, exhaust enters the exhaust inlet and moves across the first desiccant chamber to thereby cause the first desiccant to desorb the first refrigerant, and the air distribution module being coupled to the second desiccant chamber such that when the second desiccant chamber is in the cooling mode, air enters the air inlet and moves over the second desiccant chamber to thereby cause the second desiccant to absorb the second refrigerant and when the second desiccant chamber is in the re-charging mode, exhaust enters the exhaust inlet and moves over the second desiccant chamber to thereby cause the second desiccant to desorb the second refrigerant;

a plurality of valves configured to allow the first desiccant chamber to operate in the cooling mode while the second desiccant chamber is operating in the re-charging mode and the second desiccant chamber to operate in the cooling mode while the first desiccant chamber is operating in the re-charging mode;

at least one blower configured to blow ambient air across the first heat exchanger and the second heat exchanger to thereby cool the ambient air and vaporize the refrigerant settled in the first heat exchanger or the second heat exchanger respectively such that the vaporized refrigerant moves back to the first desiccant chamber or the second desiccant chamber respectively; and a cooling garment including at least one cool air input configured to receive the cooled air from the first heat exchanger and the second heat exchanger.

10. The motor cycle personal cooling system of claim 9, wherein the second refrigerant is separate from the first refrigerant.

11. The motor cycle personal cooling system of claim 9, wherein the first and second refrigerants are water.

12. The motor cycle personal cooling system of claim 9, wherein the first desiccant chamber has a second inner layer that is made of perforated material and acts as an air channel for movement of water vapor and heat.

13. The motor cycle personal cooling system of claim 9, wherein the first desiccant and the second desiccant are zeolite.

14. The motor cycle personal cooling system of claim 9, wherein the cooling garment includes air distribution channels that direct the cool air throughout the cooling garment.

15. The motor cycle personal cooling system of claim 9, wherein the cooling garment is configured to cover an upper body only.

16. The motor cycle personal cooling system of claim 9, wherein the first and second desiccant chambers are shaped so as to each encircle one of the at least one exhaust pipe.

17. The motor cycle personal cooling system of claim 9, wherein the air distribution module includes a funnel at the air inlet, the funnel being configured to face a front end of the motor cycle such that when the motor cycle moves in a forward direction, air passes through the funnel.

18. The motor cycle personal cooling system of claim 9, wherein the air distribution module includes a first air distribution pathway coupled to the first desiccant chamber and a second air distribution pathway coupled to the second desiccant chamber, the first air distribution pathway and the second air distribution pathways being generally parallel to one another.

19. The motor cycle personal cooling system of claim 9, wherein the air distribution module controls air and exhaust flow through the air distribution module through channeling of the air and the exhaust and actuation of the plurality of valves.

20. A method of operating the motor cycle personal cooling system according to claim 9, the method comprising:

coupling the exhaust inlet of the air distribution module with an exhaust pipe of a motor cycle; and coupling a connection from the first heat exchanger and the second heat exchanger to the cooling garment.

* * * * *